United States Patent
Kim et al.

(10) Patent No.: US 10,410,608 B2
(45) Date of Patent: Sep. 10, 2019

(54) METHOD FOR DISPLAYING IMAGE AND ELECTRONIC DEVICE THEREOF

(71) Applicant: SAMSUNG ELECTRONICS CO., LTD., Gyeonggi-do (KR)

(72) Inventors: Yoon-sang Kim, Anyang-si (KR); Jae-keun Na, Suwon-si (KR); Ho-chul Shin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/230,329

(22) Filed: Dec. 21, 2018

(65) Prior Publication Data

US 2019/0122640 A1 Apr. 25, 2019

Related U.S. Application Data

(63) Continuation of application No. 15/402,709, filed on Jan. 10, 2017, now Pat. No. 10,217,443.

(30) Foreign Application Priority Data

Jan. 28, 2016 (KR) .................. 10-2016-0010709

(51) Int. Cl.
*G09G 5/00* (2006.01)
*G09G 5/377* (2006.01)
(Continued)

(52) U.S. Cl.
CPC .............. *G09G 5/377* (2013.01); *B25J 9/161* (2013.01); *B25J 9/1697* (2013.01); *G01C 11/00* (2013.01);
(Continued)

(58) Field of Classification Search
None
See application file for complete search history.

(56) References Cited

U.S. PATENT DOCUMENTS

| 7,641,613 B2 * | 1/2010 | Angelsen ............ G01S 7/52022 600/458 |
| 8,718,822 B1 * | 5/2014 | Hickman ............... B25J 9/1674 700/214 |

(Continued)

FOREIGN PATENT DOCUMENTS

| EP | 3051808 A1 | 8/2016 |
| JP | 2005-161498 A | 6/2005 |

(Continued)

OTHER PUBLICATIONS

Communication dated Oct. 17, 2018, from the European Patent Office in counterpart European Application No. 17744548.3.

(Continued)

*Primary Examiner* — Martin Mushambo
(74) *Attorney, Agent, or Firm* — Sughrue Mion, PLLC

(57) ABSTRACT

An electronic device and a method for displaying an image transmitted by a robot and remotely controlling a movement of the robot are provided. The electronic device includes a communicator, an inputter, a display, and a controller. The communicator receives, from the robot, an image photographed by the robot and time information. The inputter receives a command to control the robot. The display displays a screen corresponding to the image. The controller calculates a time delay between the electronic device and the robot based on the time information, control the display to display a graphical object to be overlaid on the screen, and control the communicator to transmit the command to the robot. The graphical object represents a field of view of the robot at a current time. The field of view of the robot at the current time may be estimated based on the time delay information.

14 Claims, 15 Drawing Sheets

(51) Int. Cl.
  *B25J 9/16* (2006.01)
  *G06F 3/14* (2006.01)
  *G09G 5/38* (2006.01)
  *G01C 23/00* (2006.01)
  *H04N 5/232* (2006.01)
  *G01C 11/00* (2006.01)

(52) U.S. Cl.
  CPC ............ *G01C 23/00* (2013.01); *G06F 3/1415* (2013.01); *G09G 5/006* (2013.01); *G09G 5/38* (2013.01); *H04N 5/23206* (2013.01); *G06F 3/1454* (2013.01); *G09G 2320/106* (2013.01); *G09G 2340/12* (2013.01)

(56) References Cited

U.S. PATENT DOCUMENTS

| | | | |
|---|---|---|---|
| 8,954,853 | B2 | 2/2015 | Lacaze et al. |
| 2004/0267130 | A1* | 12/2004 | Angelsen ............ G01S 7/52022 600/458 |
| 2008/0046940 | A1 | 2/2008 | Katayama et al. |
| 2008/0121097 | A1 | 5/2008 | Rudakevych et al. |
| 2013/0194265 | A1* | 8/2013 | Rehwald ............ G01R 33/4828 345/424 |
| 2014/0032013 | A1 | 1/2014 | Riley |
| 2014/0180478 | A1 | 6/2014 | Letsky |
| 2014/0184640 | A1* | 7/2014 | Putraya .............. H04N 5/23238 345/629 |
| 2014/0347267 | A1* | 11/2014 | Nishi ...................... G06F 3/147 345/156 |
| 2015/0057801 | A1 | 2/2015 | Stephens, Jr. |
| 2015/0121222 | A1 | 4/2015 | Lacaze et al. |
| 2015/0347827 | A1* | 12/2015 | Dickinson .......... G06K 9/00302 382/103 |
| 2016/0274743 | A1* | 9/2016 | Sica ....................... G06F 3/0482 |
| 2017/0039770 | A1* | 2/2017 | Lanier ................. G06T 19/006 |

FOREIGN PATENT DOCUMENTS

| | | |
|---|---|---|
| JP | 2015-47666 A | 3/2015 |
| KR | 10-2014-0103494 A | 8/2014 |
| WO | 2008097252 A2 | 8/2008 |
| WO | 2014/126303 A1 | 8/2014 |
| WO | 2014/170439 A1 | 10/2014 |

OTHER PUBLICATIONS

International Search Report (PCT/ISA/210) dated Apr. 25, 2017 issued by the International Searching Authority in counterpart International Application No. PCT/KR2017/000866.

Written Opinion (PCT/ISA/237) dated Apr. 25, 2017 issued by the International Searching Authority in counterpart International Application No. PCT/KR2017/000866.

Office Action dated Sep. 11, 2017 issued in the U.S. Patent Office in parent U.S. Appl. No. 15/402,709.

Office Action dated Mar. 8, 2018 issued in the U.S. Patent Office in parent U.S. Appl. No. 15/402,709.

Notice of Allowance dated Oct. 11, 2018 issued in the U.S. Patent Office in parent U.S. Appl. No. 15/402,709.

* cited by examiner

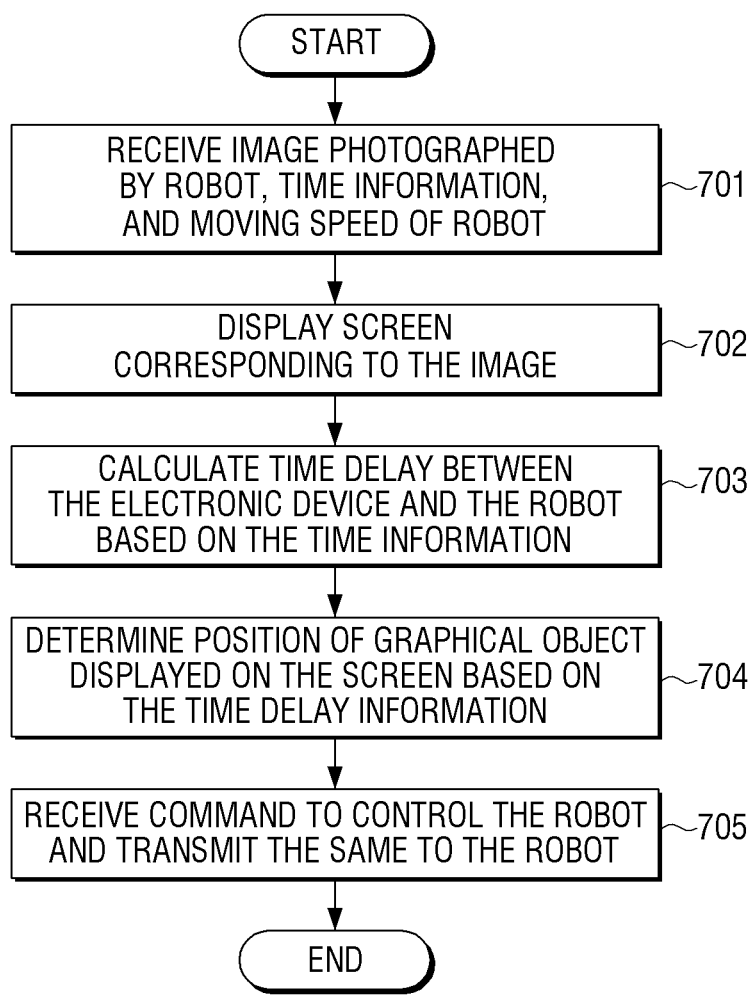

METHOD FOR DISPLAYING IMAGE AND ELECTRONIC DEVICE THEREOF

CROSS-REFERENCE TO RELATED APPLICATIONS

This is a continuation of U.S. application Ser. No. 15/402,709 filed on Jan. 10, 2017, which claims priority from Korean Patent Application No. 10-2016-0010709, filed on Jan. 28, 2016 in the Korean Intellectual Property Office, the disclosures of which are incorporated herein by reference in their entirety.

BACKGROUND

1. Field

Apparatuses and methods consistent with exemplary embodiments relate to an electronic device capable of remotely controlling a mobile robot and a method of displaying on a screen of the electronic device an image photographed by the mobile robot and information relevant thereto.

2. Description of the Related Art

With advancements in electronic and robotic technology, systems have been developed where a camera is installed at a movable robot, an image is photographed by the robot, the photographed image is remotely monitored through communication, and the robot is remotely controlled.

In systems which perform remote monitoring by using such a robot, a remote user can control a mobile robot by watching on a mobile terminal the images photographed by the mobile robot. That is, a user may move the mobile robot in various directions (e.g., left, right, up, down) while watching on the mobile terminal a series of images transmitted by the mobile robot. However, while processing the images photographed by the mobile robot, time delay may occur. Specifically, due to the delay in transmission in the communication network which connects the mobile robot with the remote user's mobile terminal, time delay may occur between an image displayed on the mobile terminal of the user and the remote control signal of the user, and thus, it may be difficult for the user to control the mobile robot.

SUMMARY

Exemplary embodiments may overcome the above disadvantages and other disadvantages not described above. However, it is understood that the exemplary embodiment are not required to overcome the disadvantages described above, and may not overcome any of the problems described above.

One or more exemplary embodiments provide an electronic device and a method of calculating a time delay between a robot and the electronic device that controls the robot, displaying information about the time delay on a screen of the electronic device, and controlling the robot in consideration of the time delay to smoothly control the robot.

According to an aspect of an exemplary embodiment, there is provided an electronic device remotely controlling a movement of a robot. The electronic apparatus may include a communicator configured to receive, from the robot, an image photographed by the robot and time information regarding the image; an inputter configured to receive a command to control the robot; a display configured to display a screen corresponding to the image; and a controller configured to calculate a time delay between the electronic device and the robot based on the time information, control the display to display a graphical object to be overlaid on the screen based on the time delay information, and control the communicator to transmit the command, input through the inputter, to the robot.

The communicator may be further configured to receive, from the robot, a moving speed of the robot. The controller may be further configured to determine a position of the graphical object displayed on the screen based on the moving speed of the robot.

The graphical object may be a quadrilateral having the same aspect ratio as the screen.

The image may be photographed by a camera included in the robot. The controller may be further configured to determine a size of the graphical object to correspond to the field of view of the camera based on a distance that the robot travels during a time corresponding to the time delay.

A size of the graphical object may change as time elapses.

The controller may be further configured to control the display to display the image and the graphical object in a first area of the screen, and display a time bar and a delay bar based on the time delay in a second area of the screen.

A length of the delay bar may change as time elapses.

The controller may be further configured to control the display to display a second graphical object corresponding to the command in the second area.

The communicator may be further configured to receive, from the robot, information regarding a change in direction of the robot, determine a display position of the graphical object based on the information regarding the change in direction, and control the display to display the graphical object to be overlaid at the display position on the screen.

The controller may be further configured to control the display to display on the screen a rotation axis around which the robot is rotating.

According to an aspect of an exemplary embodiment, a method for displaying a screen of an electronic device remotely controlling a movement of a robot includes receiving, from the robot, an image photographed by the robot and time information regarding the image, displaying a screen corresponding to the image; calculating a time delay between the electronic device and the robot based on the time information; and displaying a graphical object overlaid on the screen based on the time delay information.

The displaying the graphical object may further include determining a position of the graphical object based on a moving speed of the robot.

The graphical object may be a quadrilateral having a same aspect ratio as the screen.

The displaying the graphical object may further include determining a position and a size of the graphical object to correspond to the field of view of a camera of the robot based on a distance that the robot travels during a time corresponding to the time delay.

A size of the graphical object may change as time elapses.

The method may further include displaying the image and the graphical object in a first area of the screen, and displaying a time bar and a delay bar based on the time delay in a second area of the screen.

A length of the delay bar may change as time elapses.

The method may further include displaying a second graphical object corresponding to the command in the second area.

The method may further include receiving, from the robot, information regarding a change in direction of the robot, determining a display position of the graphical object based on the information regarding the change in direction, and displaying the graphical object to be overlaid at the display position on the screen.

The method further may include displaying on the screen a rotation axis around which the robot is rotating.

BRIEF DESCRIPTION OF THE DRAWINGS

The above and/or other aspects will be more apparent by describing in detail exemplary embodiments, with reference to the accompanying drawings, in which:

FIG. 7 is a flow chart of a method of processing an image signal received from a robot by an electronic device, according to an exemplary embodiment;

DETAILED DESCRIPTION OF EXEMPLARY EMBODIMENTS

Figure 1:
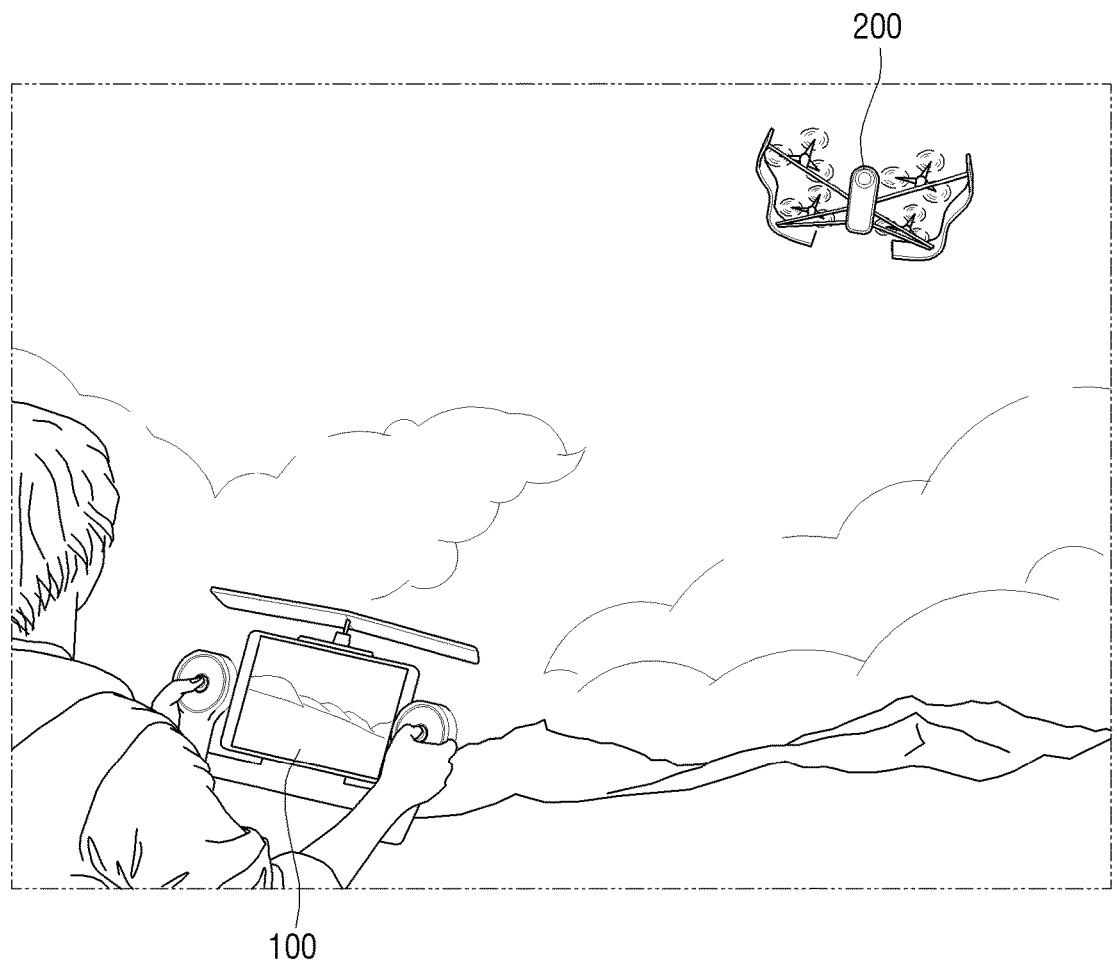
FIG. 1 is a view illustrating a configuration of a system according to an exemplary embodiment.

In the following description of exemplary embodiments, the same reference numerals may be used to denote analogous or same elements even when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art may not be described in detail because they may obscure exemplary embodiments with unnecessary detail.

In the present disclosure, relational terms such as first and second, and the like, may be used to distinguish one entity from another, without necessarily implying any actual relationship or order between such entities.

The terms used in the present application are provided to merely explain specific exemplary embodiments and are not intended to limit the scope of an inventive concept. A singular term includes a plural form and vice versa unless clearly defined otherwise. The terms "include" and "configured to" in the description of the present application are used to indicate that there are features, numbers, steps, operations, elements, parts, or combination thereof, and they should not exclude the possibility of combination or addition of one or more features, numbers, steps, operations, elements, parts, or combination thereof.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

In an exemplary embodiment, a "module" or a "unit" may perform at least one function or operation, and may be implemented with hardware, software, or combination thereof. In addition, a plurality of "modules" or "units" may be integrated into at least one module and may be implemented with at least one process except for "modules" or "units" that should be realized in specific hardware. When one element is described as being "connected" to another element, it may mean that the two elements are directly connected to each other or it may mean that the two elements are connected indirectly through yet another element in the middle. On the other hand, when an element is described as being "directly connected" to another element, it is to be understood that the two elements are connected to each other without any other elements or components present in between.

Throughout this disclosure, the expression "configured to" may be used interchangeably with, for example, including but not limited to, "suitable for," "having the capacity to," "designed to," "adapted to," "made to," or "capable of." The term "configured to" may not necessarily mean "specifically designed to" in terms of hardware. Instead, under some circumstances, "a device configured to" may indicate that such device can "do" or "perform" in conjunction with another device or part. For example, the expression "a processor configured to perform A, B, and C" may indicate that an exclusive processor (e.g., embedded processor) may perform the corresponding operation, or that a general-purpose processor (e.g., central processing unit (CPU) or application processor (AP)) may perform the corresponding operations by executing one or more software programs stored in the memory device.

Hereinafter, the electronic device according to various exemplary embodiments may include, for example, at least one of a smartphone, a tablet computer, a mobile phone, a video telephone, an e-book reader, a desktop personal computer (PC), a laptop PC, a netbook computer, a wearable computing device, an appliance, a vehicle, a workstation, a server, a personal digital assistant (PDA), and a portable multimedia player (PMP). According to various exemplary embodiments, a wearable device may include at least one of an accessory type (e.g., a watch, a ring, a bracelet, a necklace, a contact lens, or a head-mounted display (HMD) device, etc.), texture of clothes-mounted type (e.g., electronic clothes), body-mounted type (e.g., skin pad or tattoo), and implantation type (e.g., an implantable circuit).

A "robot" may refer to any autonomous or semi-autonomous mechanical or virtual entity that is equipped with artificial intelligence. The robot may be implemented with hardware, software, or a combination of both. In this disclosure, a "visual field of a robot" may indicate an area which may be photographed by a camera included in the robot.

A "screen" may refer either to a display device on which an image may be displayed or to the image data displayed on the display device. For example, a screen may be a collection of graphical objects such as text, pictures, icons, menu items, etc. to be displayed on a display device.

In this disclosure, an "image" may be interpreted as an image signal. The image may be a single image or a series of images such as movie.

Hereinafter, an electronic device according to various exemplary embodiments is described. In this document, the term "user" may indicate a person who uses an electronic device. The user may also refer to a device (e.g., artificial intelligence device) that uses another electronic device.

FIG. 1 is a view illustrating a configuration of a system according to an exemplary embodiment.

As shown in FIG. 1, an electronic device 100 and a robot 200 are illustrated. The robot 200, for example, may be an aerial vehicle such as a drone (also known as an unmanned aerial vehicle) or a quadcopter, and may include a camera. Other forms of the robot 200 will be described later with reference to FIG. 5. The robot 200 may transmit an image photographed by the camera to the electronic device 100.

The electronic device 100 may include a display and display an image (e.g., live video feed) transmitted from the robot 200 on the display. The electronic device 100 may operate in conjunction with a remote controller which controls the robot 200. For example, a user may control the robot 200 while watching an image transmitted from the robot 200. The robot 200 may transmit the photographed image to the electronic device 100 wirelessly. In this case, between the time when the image is photographed by the robot 200 and the time that the transmitted image is displayed on the display of the electronic device 100, a time delay (i.e., latency) may occur. To be specific, between the robot 200 and the electronic device 100, a time delay may occur due to the difference in protocol, information delivery size (e.g., packet size), and/or performance of image processors. In addition, the conditions of the wireless communication environment may also cause latency.

Figure 2:
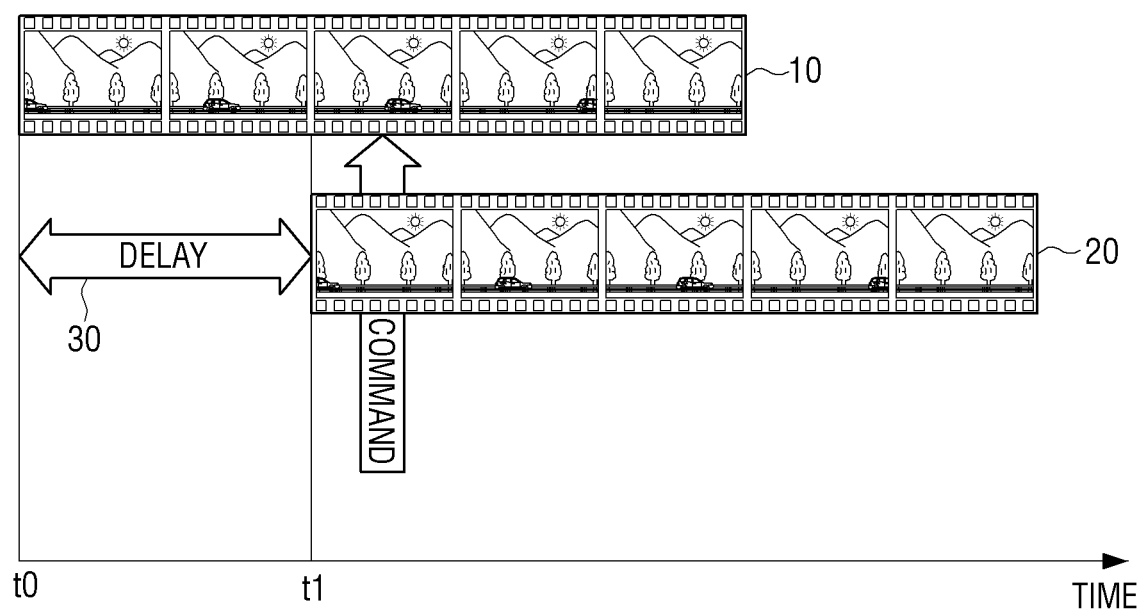
FIG. 2 is an exemplary timeline illustrating a time delay between images photographed by a robot and a images displayed on a display of an electronic device.

FIG. 2 is an exemplary timeline illustrating a time delay between images photographed by a robot and images displayed on a display of an electronic device.

In FIG. 2, the image 10 photographed by the robot 200 and the image 20 displayed on the display of the electronic device 100 are illustrated. Between the image 10 photographed by the robot 200 and the image 20 displayed on the display of the electronic device 100, a time delay 30 may occur. For example, the time delay 30 can be $t_1$. That is, a user may only be able to see the image 10 photographed by the robot 200 on the screen displayed as the image 20 on the display of the electronic device after the $t_1$ time. When the user inputs a command, such as steer, accelerate, or camera zoom, to control the robot 200 while watching a first screen displayed on a screen of the electronic device 100, the robot 200 may receive the user command on the third screen, and a result of performing the operations according to the command by the robot 200 may be displayed on the display of the electronic device 100 after the $t_1$ time. For example, when the user sees the first screen displayed on the display and enters a stop command to stop the movement of the robot 200, the robot 200 may stop, but the robot 200 may still transmit an image photographed while the robot 200 is in motion for the next $t_1$ time before the robot 200 finally transmits an image photographed after the robot 200 is in a stationary position.

That is, between the time that an image is photographed by the robot 200 and the time that the transmitted image is displayed on the display of the electronic device 100, the time delay 30 may occur due to a difference in protocols, a difference in information delivery units, a difference in performances of image processors (e.g., the image processor included in the robot 200 may be slower than the image processor included in the electronic device 100), and/or conditions of the wireless communication environment.

Figure 3:
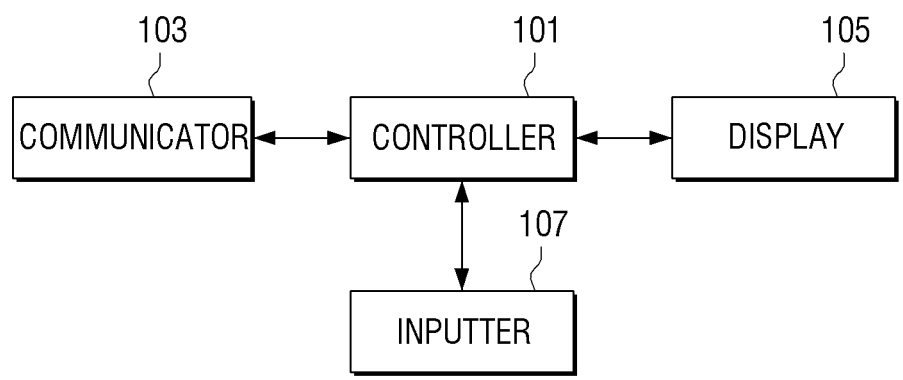
FIG. 3 is a block diagram of an electronic device according to an exemplary embodiment.

FIG. 3 is a block diagram of an electronic device according to an exemplary embodiment.

As shown in FIG. 3, the electronic device 100 may include a controller 101, a communicator 103, a display 105, and an inputter 107.

The controller 101, for example, may control many hardware or software elements or components connected to the controller 101 by operating an operating system or one or more application programs, or perform various data processing and calculation. The controller 101, for example, may be implemented with a system on a chip (SoC). According to an aspect of an exemplary embodiment, the controller 101 may further include a graphics processing unit (GPU) and/or an image signal processor. The controller 101 may load a command or data received from one or more other components (e.g., non-volatile memory) to volatile memory (e.g., random access memory (RAM)) and store various data in a non-volatile memory.

The controller 101, through the communicator 103, may calculate a time delay between the electronic device 100 and the robot 200 based on time information received from the robot 200, determine a position or size of a graphical object displayed on a screen of the display 105 based on the time delay information, and control the display 105 to display a graphic object to be overlaid on the screen. The controller 101 may control the communicator 103 to transmit to the robot 200 a command that was input through the inputter 107.

To be specific, the controller 101, based on a moving speed of the robot 200, may determine a position of a graphical object displayed on a screen. In this case, the graphical object may be a quadrilateral (e.g., rectangle) having the same aspect ratio as the screen. In addition, the controller 101, during the time corresponding to the time delay, may determine the size of the graphical object to correspond to an viewing angle photographed by a camera of the robot 200, and determine a position of the graphical object that reflects an estimated distance that the robot 200 would have traveled during the time of delay. The size of the graphical object may change as time elapses.

In addition, the controller 101 may control the display 105 to display a screen and a graphical object in a first area of the display 105, and display a delay bar that consists of a time bar and a time delay indicator in a second area of the display 105. The length of the delay bar can change as time elapses. The controller 101 may control the display 105 to display in the second area of the display 105 a graphical object corresponding to the command input by the user.

In addition, the controller 101 may control the display 105 to receive, from the robot 200 and through the communicator 103, information regarding a direction change of the robot 200, determine a position of a graphical object corresponding to the direction change on a screen, and display the graphical object overlaid at the position on the screen. In addition, when the robot 200 changes its direction, the controller 101 may control the display 105 to display on the screen a rotation axis along which the robot 200 rotates.

The communicator 103 may receive, from the robot 200, one or more images (e.g., video feed) photographed from the robot 200, time information, moving speed information of the robot 200, etc. The time information may be information with respect to the time which the robot 200 photographs an image, such as a timestamp. The timestamp may include such temporal elements as a year, a month, a day, an hour, a minute, a second, etc. The moving speed information of the robot 200 may include a direction of movement, a speed of movement, a velocity of movement, and/or an orientation of the robot 200.

In addition, the communicator 103 may transmit a robot control command input by a user for the robot 200. For example, the communicator 103 may send to the robot 200 a command for accelerating forward, backward, left, right, upward, and downward; decelerating; tilting (e.g., rolling, pitching, yawing); and stopping. In addition, the communicator 103 may receive from the robot 200 information regarding a direction change of the robot 200.

In the meantime, the communicator 103 may include one or more communication modules such as a cellular module, a WiFi module, a Bluetooth module, a near field communication (NFC) module, and a radio frequency (RF) module.

The cellular module, for example, may provide voice call, video call, short message service (SMS), or Internet service through a communication network. According to an aspect of an exemplary embodiment, the cellular module, by using a subscriber identification module (SIM) card, may perform identification and authentication of the electronic device 100 in the communication network. According to an aspect of an exemplary embodiment, the cellular module may include a communication processor (CP).

The WiFi module, the Bluetooth module, or the NFC module, for example, may include a processor for processing data which is received and transmitted through a corresponding module. According to an aspect of an exemplary embodiment, at least some (e.g., two or more) of the cellular module, the WiFi module, the Bluetooth module, and the NFC module may be included in one integrated chip (IC) or an IC package.

The RF module, for example, may receive or transmit a communication signal (e.g., an RF signal). The RF module, for example, may include a transceiver, a power amplifier module (PAM), a frequency filter, a low noise amplifier (LNA), or an antenna. According to an aspect of an exemplary embodiment, at least one of the cellular module, the WiFi module, the Bluetooth module, a global navigation satellite system (GNSS) module, and the NFC module may receive or transmit an RF signal through a separate RF module.

The display 105 may include, for example, a liquid crystal display (LCD), a light-emitting diode (LED) display, an organic light-emitting diode (OLED) display, a microelectromechanical systems (MEMS) display, or an electronic paper (e-paper) display. The display 105, for example, may display various types of content (e.g., text, images, videos, icons, graphical objects, symbols, etc.) for a user. The display 105 may include a touch screen interface capable of receiving, for example, an electronic stylus, a part of the user's body (e.g., fingers), a gesture, proximity, or hovering as an input.

The display 105 may display a screen which corresponds to an image transmitted from the robot 200. To be specific, an image photographed by a camera included in the robot 200 may be transmitted to the electronic device 100, and the electronic device 100 may display a screen corresponding to the transmitted image on the display 105. In addition, the display 105 may display a graphical object based on time delay information between the electronic device 100 and the robot 200 to be overlaid on the screen. The graphical object may be a quadrilateral (e.g., a rectangle) having the same ratio as the aspect ratio of the screen displayed on the display 105. Alternatively, the graphical object may have a different shape such as a circle, an oval, a polygon, etc. The display 105 may include a first area and a second area. In the first area of the display 105, a screen corresponding to the image photographed by the camera of the robot 200 and a graphical object based on time delay information may be displayed. For example, on the display 105, a graphical object in the shape of a rectangle may be displayed. In the second area of the display 105, a time bar and a delay bar may be displayed. The length of the time bar may be equal to or less than the length of one side of a screen displayed on the display 105. On the time bar, the time information can be displayed, and length of the time bar may represent the duration of time. The delay bar may indicate information regarding the time delay. The length of the delay bar may be proportional to the time delay. That is, the length of the delay bar may change as the time passes.

In the second area of the display 105, a graphical object corresponding to a command input by the user may be displayed. In the display 105, a graphical object based on the direction change of the robot 200 may be displayed on the screen as an overlay. In addition, on the display 105, a rotation axis along with the robot 200 rotates may be displayed.

The inputter 107 may include, for example, a touch panel, a pen sensor (e.g., a digital pen sensor), a button, or an ultrasonic input device. The touch panel, for example, may be of a capacitive, resistive, infrared, or ultrasonic type. In addition, the touch panel may further include a control circuit. The touch panel may further include a tactile layer for providing a tactile response to the user.

The pen sensor, for example, may be a part of the touch panel or include a separate recognition sheet. The button, for example, may include a physical button, an optical button, or a keypad. The ultrasonic input device, through a microphone, may sense an ultrasonic wave generated by an input means, and identify data corresponding to the sensed ultrasonic wave.

The inputter 107 may receive a command to control the robot 200. For example, a user may input a command to move the robot 200 forward, backward, left, right, upward, and downward through the inputter 107.

The various components illustrated in FIG. 3 are merely exemplary, and according to other embodiments to implement the electronic device, other components, elements, and devices (e.g., a memory, a camera, a sensor, etc.) may be added, or the existing components may be deleted.

Figure 4:
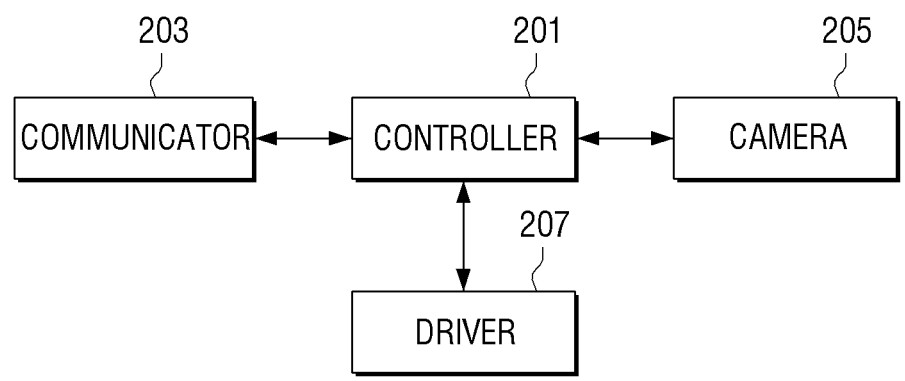
FIG. 4 is a block diagram of a robot according to an exemplary embodiment.

FIG. 4 is a block diagram of the robot 200 according to an exemplary embodiment.

As shown in FIG. 4, the robot 200 may include a controller 201, a communicator 203, a camera 205, and a driver 207.

The controller 201 may control the overall operations of the robot 200. In particular, the controller 201 may control the communicator 203 to transmit, to the external device 100, an image photographed by the camera 205 and various information (e.g., position information, speed information, acceleration information, direction information, time information, etc.) obtained by one or more sensors of the robot 200.

In addition, the controller 201 may control the driver 207 to control the movement or operations of the robot 200 according to a user command received from the electronic device 100. The controller 201 may be substantially similar to the controller 101 of the electronic device 100 in structure and function although it is possible for the controller 101 and the controller 201 may have different processing powers, capabilities, and functionalities.

The communicator 203 may transmit, to the electronic device 100, an image photographed by the robot 200, time information, and moving speed information of the robot 200. The time information may be information regarding the time at which the robot 200 photographs an image. For example, the time information may be a timestamp. The moving speed information of the robot 200 may include a moving direction, a moving speed, a moving velocity, an orientation, and moving acceleration information of the robot 200.

In addition, the communicator 203 may receive, from the electronic device 100, a command input from a user for controlling the robot 200. For example, the communicator 203 may receive, from the electronic device 100, a command for accelerating forward, backward, left, right, upward, or downward; decelerating; tilting; or stopping of the robot 200. In addition, the communicator 203 may transmit, to the electronic device 100, information regarding a direction change of the robot 200.

In the meantime, the communicator 203 may one or more communication modules such as a cellular module, a WiFi module, a Bluetooth module, an NFC module, or an RF module.

The camera 205 may be a device capable of photographing a still or moving image. According to an aspect of an exemplary embodiment, the camera 205 may include an image sensor (e.g., a front sensor or a rear sensor), a lens, an image signal processor (ISP), or a flash (e.g., an LED, a xenon lamp, etc.).

The driver 207 may include at least one motor that moves the robot 200. If the robot 200 is a drone, the driver 207 may propel the robot 200 to move forward, backward, left, right, upward, downward, or hover at a constant altitude. The driver 207 can be controlled according to a command transmitted from the electronic device 100.

According to an aspect of an exemplary embodiment, the robot 200 may further include a sensor. The sensor, for example, may include one or more gyro sensors, acceleration sensors, or global position system (GPS) sensors. The robot 200, through a GPS module, may obtain information about the position and the speed or velocity of movement of the robot 200, and through the acceleration sensor, may obtain information about the acceleration of the robot 200. The robot 200 may transmit to the electronic device 100 position information, speed information, velocity information, acceleration information, and/or direction information of the robot 200, along with the images photographed by the camera and time information thereabout.

Figure 5:
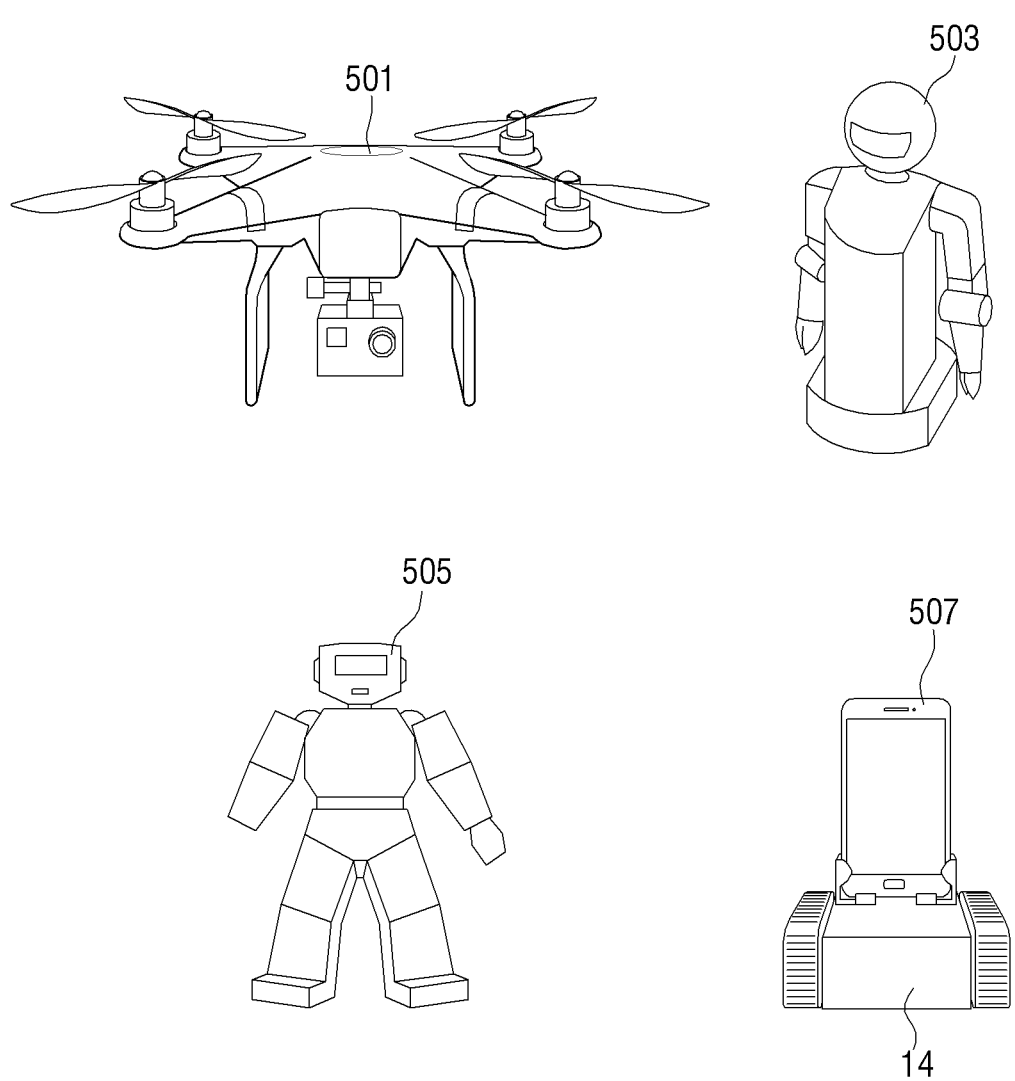
FIG. 5 illustrates various examples of a robot.

FIG. 5 illustrates various examples of a robot.

FIG. 5 illustrates various types of robots including a drone type robot 501, a wheel-driven robot 503, a bipedal robot 505, and a caterpillar track-driven robot 507. The robots 501, 503, 505, and 507 may include a camera and may transmit an image photographed by the camera to an electronic device.

A robot may be categorized as either a standalone type 501, 503, 505 or a combination type 507. The standalone type robots 501, 503, 505 may perform all the functionalities of the robot independently. The combination type robot 507, on the other hand, may combine with another functionally separate electronic device to form one robot. For example, the combination type robot 507 may be equipped with a driver (e.g., a motor) and a docking station or a connector through which a second device (e.g., a mobile phone) may be connected. Thus, the second device may be mounted on the docking station and the driver may move the robot 507 to a desired position.

The drone type robot 501 may include one or more propellers or rotors. For example, the drone type robot 501 may be a quadcopter having four rotors. The propellers and/or rotors may maneuver the main body of the robot 501 to move forward, backward, left, right, upward, or downward, or hover at a specific altitude.

The wheel-driven robot 503 may use wheels as a means of transportation. The wheel-driven robot 503 may, for example, move forward, backward, left, and right on the wheels.

The bipedal robot 505 may have legs and ambulate in a manner similar to a human being. Although FIG. 5 shows the bipedal robot 505 having two legs, the robot may have three or more legs.

The caterpillar track-driven robot 507 may be driven by two continuous tracks, also known as caterpillar tracks or tank treads.

Hereinafter, a drone type robot 501 will be used to describe the various exemplary embodiments, but the embodiments are not limited in that regard. For example, various embodiments disclosed herein may be implemented with any of the various exemplary robot types shown in FIG. 5.

Figure 6:
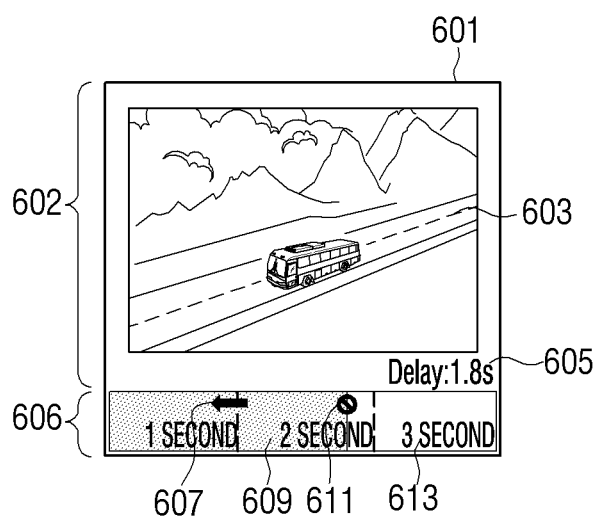
FIG. 6 illustrates an example of a screen displayed on a display of an electronic device according to an exemplary embodiment.

FIG. 6 illustrates an example of a screen displayed on the display of the electronic device 100 according to an exemplary embodiment.

As shown in FIG. 6, the display 601 of the electronic device 100 may include a first area 602 and a second area 606. In the first area 602, an image 603 which is photographed by the robot 200 may be displayed. In the second area 606, a time bar 613, a delay bar 609, and icons 611, 607 corresponding to commands input by a user may be displayed. The time bar 613 may include information regarding time and visually indicate the passing of time. The delay bar 607 may include information regarding a time delay between the electronic device 100 and the robot 200 and visually depict the time delay. With the delay bar 609, a user may visually identify the time delay between the electronic device 100 and the robot 200. When the length of the delay bar 609 gets longer, it may mean that the time delay between the robot 200 and the electronic device 100 is increasing.

The icon 611 may be a graphical object corresponding to a stop command issued by a user. The icon 607 may be a graphical object corresponding to a user command to steer the robot 200 and may be displayed as an arrow. The direction of the arrow may indicate a turn direction of the robot 200. For example, when the user enters a right turn command, an icon with a right arrow direction may be displayed, and when the user enters a left turn command, an icon with a left arrow direction may be displayed. The length of the arrow may correspond to the duration of time for which the user command was received. For example, when a user enters a left turn command for 0.5 seconds, a left arrow direction icon 607 having a length corresponding to the time of 0.5 seconds may be displayed in the second area 606. If, on the other hand, the user enters a left turn command for 0.3 seconds, a left arrow direction icon having a length corresponding to the time of 0.3 seconds (i.e., shorter in length than the arrow corresponding to 0.5 seconds of user command) may be displayed in the second area 606. Alternatively, the length of the arrow may correspond to an acceleration of the movement of the robot 200. In other words, a longer arrow may indicate that the movement of the robot 200 is to be accelerated at a greater rate.

The delay bar 609 may indicate a time delay 30 between the electronic device 100 and the robot 200. For example, the delay bar 609 may indicate the time it takes for an image photographed by the robot 200 to be displayed on the display 601 of the electronic device 100. The length of the delay bar 609 may correspond to the amount of time delay. For example, the length of the delay bar 609 may be proportional to the amount of time delay In other words, if the time delay is relatively long, the length of the delay bar 609 may be lengthened, and if the time delay is relatively short, the length of the delay bar 609 may be shortened accordingly. The time delay 605 may be also indicated numerically, for example, at a lower end of the first area 602 of the display 601.

The icons 611 and 607 may be displayed based on the time when a user enters a command. For example, when a user enters a left turn command when the time delay is 1.2 seconds, the icon 607 with a left arrow direction may be displayed at a position on the delay bar 609 that corresponds to 1.2 seconds of delay. In another example, if the user enters a stop command when the time delay is 1.8 seconds, the stop command icon 611 may be displayed at a position on the delay bar 609 that corresponds to 1.8 seconds of delay.

The time delay between the electronic device 100 and the robot 200 has already been described with reference to FIG. 2, and thus, further details will not be described.

Although FIG. 6 illustrates the time information and the delay information as being conveyed in the form of a bar graph, the time and delay information may be displayed via different means according to exemplary embodiments. For example, the time and delay information may be presented with a pie graph, a clock, a speedometer, an indicator, numbers, etc.

FIG. 7 is a flowchart a method of processing an image signal received by the electronic device 100 from the robot 200 according to an exemplary embodiment.

At step 701, the electronic device 100 may receive an image photographed by the robot 200, time information, and moving speed information of the robot 200. The robot 200 may transmit the image photographed by the camera 205 to the electronic device 100. The robot 200, while transmitting the image to the electronic device 100, may transmit in an image signal the time information related to the image along with the photographed image. At this time, the time information may be included in an image signal and transmitted to the electronic device 100, or transmitted to the electronic device 100 using a communication channel that is different from the one used to send the image signal. In addition, the robot 200 may transmit information regarding the moving speed of the robot 200 to the electronic device 100. Information on the moving speed may also be included in the image signal and transmitted to the electronic device 100, or transmitted to the electronic device 100 using a separate communication channel different from a communication channel used for transmitting the image signal. The information regarding moving speed of the robot 200 may be obtained through one or more sensors included in the robot 200. For example, through a gyro sensor and/or an acceleration sensor included in the robot 200, the speed, velocity, and/or acceleration of the robot 200 may be measured. The moving speed of the robot 200 may be also obtained through the GPS included in the robot 200.

The electronic device 100, at step 702, may display a screen corresponding to an image received from the robot 200. The electronic device 100 may display on the display 105 an image transmitted from the robot 200. The electronic device 100, by using an image signal received from the robot 200, may create a screen and display the screen on the display 105.

The electronic device 100, at step 703, may calculate a time delay between the electronic device 100 and the robot 200 based on the time information received from the robot 200. The electronic device 100 may calculate the difference between time information received from the robot 200 and the time information of the current electronic device 100 and obtain the time delay information. For example, when the photographing time of an image received from the robot 200 is t, and the time of the current electronic device 100 is t+a, the time delay may be a.

The electronic device 100 may determine a position of a graphical object displayed on the screen based on the time delay information at step 704. For example, the graphical object can be a quadrilateral, particularly but not limited to a rectangle, having the same ratio as the aspect ratio of the screen. In addition, the electronic device 100, during the time that corresponds to the time delay, may determine the size of the graphic object to correspond to a viewing angle or field of view (also known as a field of vision) of the camera 205 of the robot 200 at a position that reflects the moving distance of the robot 200. The size of the graphical object may change as time goes by. That is, the electronic device 100, during the time that corresponds to the time delay, may estimate the moving distance of the robot 200 during that time, determine a position on the screen corresponding to the distance, and draw the graphical object at the position. Thus, the user can predict the likely current position of the robot 200 on the screen despite the latency involving the transmission of the image feed.

The electronic device 100 may display the screen and the graphical object in the first area of the display 105, and display a time bar and a delay bar based on the time delay in the second area of the display 105. The length of the delay bar may change over time. The time bar and the delay bar may be represented as a bar graph, and the length thereof may change as time goes by. The time bar and the delay bar have been explained in reference to FIG. 6 in detail and thus will not be further detailed.

The electronic device 100, at step 705, may receive a command to control the robot 200 and transmit the command to the robot 200. The electronic device 100 may receive the command to control the robot 200 from a user. For example, the electronic device 100 may receive from a user a command to move the robot 200 forward, backward, left, right, upward, downward, and stop, and transmit the same to the robot 200. At this time the electronic device 100 may display a graphical object corresponding to the command in the second area of the display 105. The user may input the command to the electronic device 100 via an input device such as a joystick, a yoke (also known as a control column), a throttle, a knob, a button, a slider, a touchscreen, a voice, a gesture, etc.

In addition, the electronic device 100 may receive information from the robot 200 information regarding a direction change of the robot 200, determine a display position of a graphical object on a screen corresponding to the direction change, and display the graphical object to be overlaid on the screen. In addition, the electronic device 100 may display on a screen a rotation axis along which the robot 200 may be rotating.

The electronic device 100, based on the time delay information, may display a graphical object to be overlaid on the screen. The display type of the graphical object will be described later in reference to FIGS. 8A to 11.

FIGS. 8A to 11 illustrate various examples of displaying on a screen an image received from the robot 200 by the electronic device according to an exemplary embodiment.

Figure 8A:
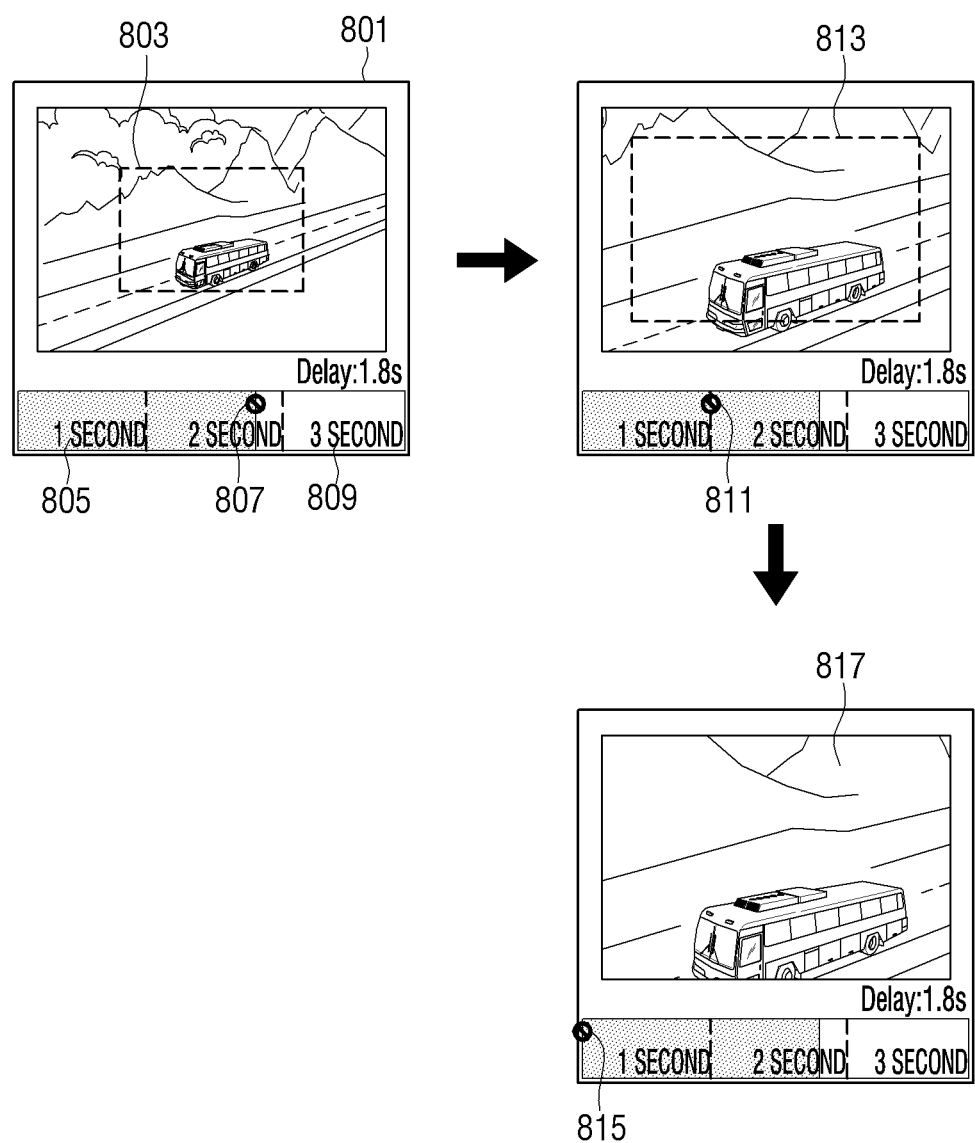
FIGS. 8A, 8B, 9A, 9B, 10A, 10B and 11 are views illustrating various examples of displaying on a screen an image signal received from a robot by an electronic device and time delay information on a screen according to an exemplary embodiment.

FIG. 8A illustrates an example screen displayed when a user enters a stop command while the robot 200 is flying straight ahead. As shown in FIG. 8A, the display 105 may illustrate an image 801 transmitted from the robot 200, a graphical object 803 illustrating a position of the robot 200 on the screen at the current point in time, a time bar 809, a delay bar 805, and a stop command icon 807. While the robot 200 moves straight ahead, the image transmitted from the robot 200 may be displayed in the first area of the display 105 of the electronic device 100. For example, when the time delay between the robot 200 and the electronic device 100 is 1.8 seconds, the delay bar 805, shown in FIG. 8A as a bar with a darker shade, may be displayed as having a length corresponding to 1.8 seconds within the time bar 809. While the time delay is 1.8 seconds, when a user enters a stop command, the stop command icon 807 may be displayed to be overlaid at the right edge of the delay bar 805. The icon 807 may be a graphical object. At this time, the icon 807 may be located at the 1.8 second mark within the time bar 809. In addition, the electronic device 100 may transmit the stop command to the robot 200.

The graphical object 803 may be a user interface (UI) element indicating a predicted position, a predicted viewing angle, or a predicted field of view of the robot 200 at the current time. The graphic object 803 may be displayed based on the time delay between the robot 200 and the electronic device 100, and indicate on the screen a position, viewing angle, or field of view of the robot 200 at the current time, as predicted based on the time delay and the current speed of the robot 200. The electronic device 100 may convert the time delay information to spatial information on the screen and display the same as the graphical object 803. That is, the electronic device 100 may change the size and position of the graphical object 803 according to the time delay information and display the same. To be specific, the graphical object 803 may indicate information corresponding to the viewpoint of the robot 200 from the estimated position of the robot 200 at the current time. For example, the image displayed on the screen may be an image that is photographed by the robot 200 1.8 seconds ago, but the current position of the robot 200 may correspond to the position of the graphical object 803 displayed on the screen 801.

The size of the graphical object 803 may gradually decrease as the time delay increases because the robot 200 would have covered a greater distance during the time delay, and the size of the graphic object 803 may gradually increase as the time delay decreases because the robot 200 would have covered a smaller distance during the time delay. That is, the shorter the time delay is, more similar the size of graphical object is to the size of the entire screen, and thus, the size of the graphical object 803 may increase to be similar to the screen.

When a stop command is entered by a user, the robot 200 may cease the forward movement, and thus, the time delay between the robot 200 and the electronic device 100 may get smaller, and accordingly, the position of the stop command icon 807 may move in a left direction. In addition, the size of the graphical object 813 may grow gradually and when time delay becomes 0, the graphical object 813 may disappear from the screen.

In the second drawing of FIG. 8A, it is illustrated that the time delay has gotten smaller compared to the first drawing, and the stop command icon 811 has moved left. As the time delay gets smaller, the size of the graphical object 813 may be displayed to be greater than the first drawing.

The third drawing of FIG. 8A depicts the moment when the time delay becomes 0. The icon 815 corresponding to the stop command may be located at the left end of the delay bar 805, and the graphical object 813 may eventually disappear from the screen 817.

Figure 8B:
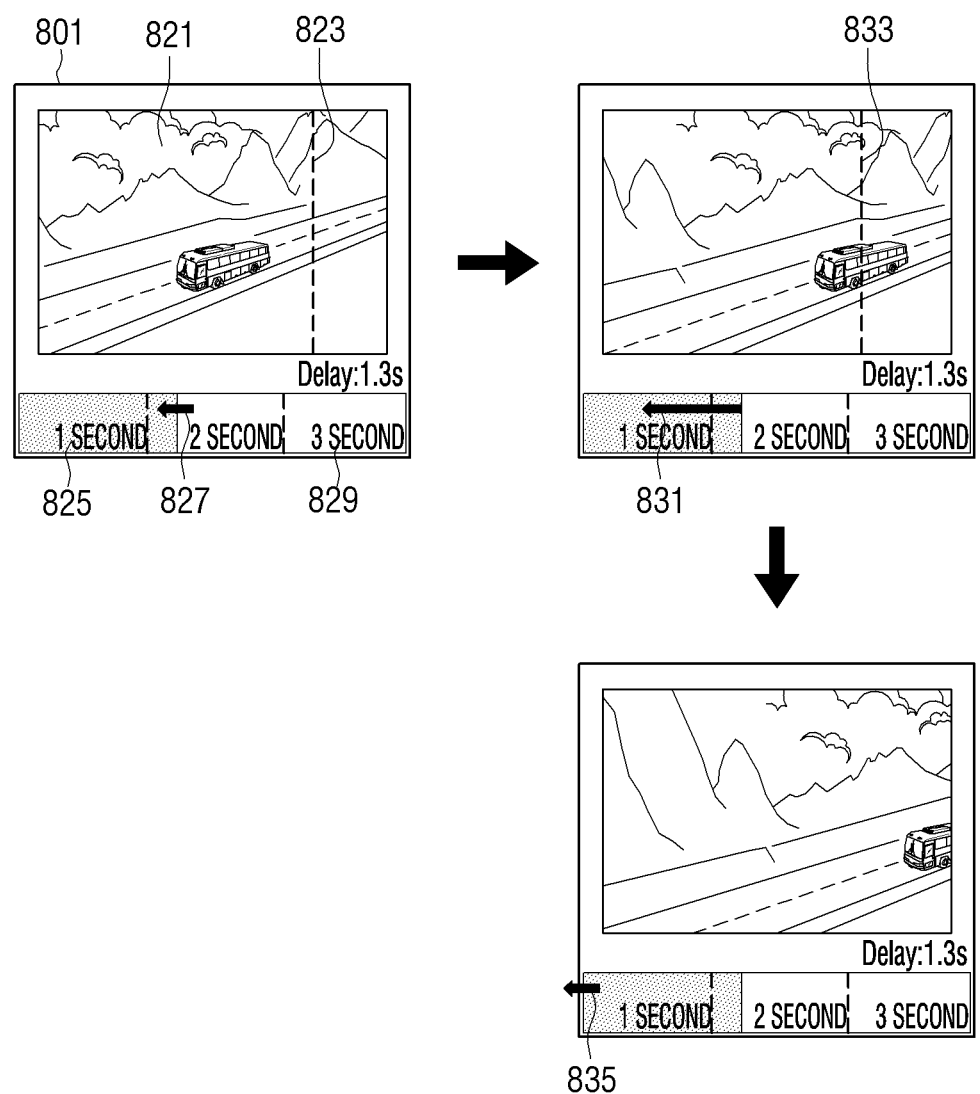

FIG. 8B illustrates an example of a graphical object displayed on the screen 100 of the electronic device while the robot 200 rotates. FIG. 8B illustrates an image 821 transmitted from the robot 200, a graphical object 823, a time bar 829, a delay bar 825, and a rotate command icon 827. The graphical object 823 may be a guide UI element indicating the estimated field of view of the robot 200 at the current time according to the rotate command issued by the user. In addition, the graphical object 823 may indicate an area which may have already disappeared from the viewing angle as the robot 200 rotates. In this case, the area which appears as indicated by the graphic object 823 may be displayed differently from the remaining areas. For example, the disappearing area may be displayed in black and white while the "live" area remains in color. In other examples, the disappearing area may be displayed in a different tint, hue, brightness, etc. In addition, the graphical object 823 may display the position where the robot 200 starts to rotate on the screen 801.

The rotate command icon 827, for example, may be displayed as an arrow and include information regarding the time that the user issued the rotate command. If the user maintains the rotate command for a longer period of time, the length of the arrow 827 may get longer, and when the user issues the rotate command for a shorter period of time, the length of the arrow 827 may be similarly shortened. For example, when the user presses a rotate command button for 4 seconds, the arrow may be displayed with a length that corresponds to 4 seconds, but when the user presses the rotate command button for 2 seconds, the arrow may be displayed with a length that corresponds to 2 seconds. In addition, a direction of the arrow 827 may indicate a turn direction. For example, when the user issues a rotate left command, a left arrow 827 may be displayed, and when the user issues a rotate right command, a right arrow may be displayed.

The length of the rotate command icon 827 may gradually decrease when the robot 200 stops turning. For example, when the user stops issuing the rotate command after 5 seconds of issuing the rotate command, the rotate command icon 827 may first increase, then decrease, and then eventually disappear from the screen.

While the robot 200 moves forward, when the user issues a rotate command, the position where the robot 200 rotates may be displayed on the screen 801. That is, a line 823 indicating a turning position of the robot 200 may be displayed on the screen. The electronic device 100, based on the time delay, the rotational speed of the robot 200, and the command input by the user, may determine the current rotational position of the robot 200 and the position of the line 823 within the screen 801, and display the line 823 on the screen 801. The position of the line 823 may move left or right as the time delay, the rotational speed of the robot 200, and/or the user input changes. The position of the line 823 may include information about the current position of the robot 200.

For example, as illustrated in the first drawing of FIG. 8B, while the robot 200 moves forward, when the user presses a rotate left button, the robot 200 may cease the forward movement and start to rotate left. According to the rotate left command, the robot 200 may stop moving forward, but due to the time delay, the image 821 on the screen may still depict the robot 200 as moving forward, and thus, as the robot 200 starts rotating left, a portion of the screen on the right may disappear and the line 823 may be displayed to represent the predicted viewing angle of the robot 200 at the current moment. In addition, in the second area of the display 105, a left arrow 827 corresponding to the rotate left command may be displayed.

As the user keeps pressing the rotate left button, the robot 200 may keep turning left. In addition, the length of the left arrow 827 that corresponds to the rotate left command may increase further. As illustrated in the second drawing of FIG. 8B, the length of the left arrow 831 may be displayed to be longer than the arrow 827 in the first drawing. In the meantime, due to the time delay, the robot 200 may have further moved in the (original) forward direction, and thus, on the screen, the image 821 of the robot 200 may still depict the robot 200 as continuing to move in the forward direction, and at the same time, the robot 200 may have further rotated towards left in reality, thus the position of the line 833 may be displayed as moving further to the left. Thus, the line 833 may inform the user of the turning angle (i.e., rotational position) of the robot 200.

As the user keeps issuing the rotate left command, the line may keep moving to the left, and when the user stops issuing the rotate left command, the robot 200 may stop rotating, but due to the time delay, the line may continue to move in the left direction and then disappear from the screen. In addition, the left arrow corresponding to the rotate left command may extend to the left edge of the second area of the display 105 and when the rotate left command is no longer entered by the user, the left arrow may gradually decrease and disappear from the second area of the display 105.

The third drawing of FIG. 8B shows the arrowhead portion of the left arrow icon 835 reaching the left edge of the screen 105. As time passes, the size of the left arrow 835 may gradually decrease and disappear from the second area of the display 105.

Although FIG. 8B shows the line 823 as moving from right to left as the robot 200 rotates left, the line 823 may move in other directions as well. For example, if the robot 200 is rotating right (i.e., yawing in a clockwise direction), the line 823 may move from the left edge of the screen 105 towards the right edge of the screen 105. In another example, if the robot 200 is rotating upward (i.e., pitching up), the line 823 may be a horizontal line moving from the bottom edge of the screen 105 towards the top edge of the screen 105. Similarly, if the robot 200 is rotating downward (i.e., pitching down), the line 823 may be a horizontal line moving from the top edge of the screen 105 towards the bottom edge of the screen 105. The robot 200 may also roll left or right, or rotate along two or more axes (e.g., yawing and pitching at the same time). In such cases, a rectangle similar to the one shown in FIG. 8A may move across the screen 105 to estimate the current viewing angle of the robot 200. For example, if the robot 200 is rolling to the left, the rectangle representing the viewing angle of the robot 200 may rotate counterclockwise on the screen 105 to simulate the current viewing angle of the robot 200.

Figure 9A:
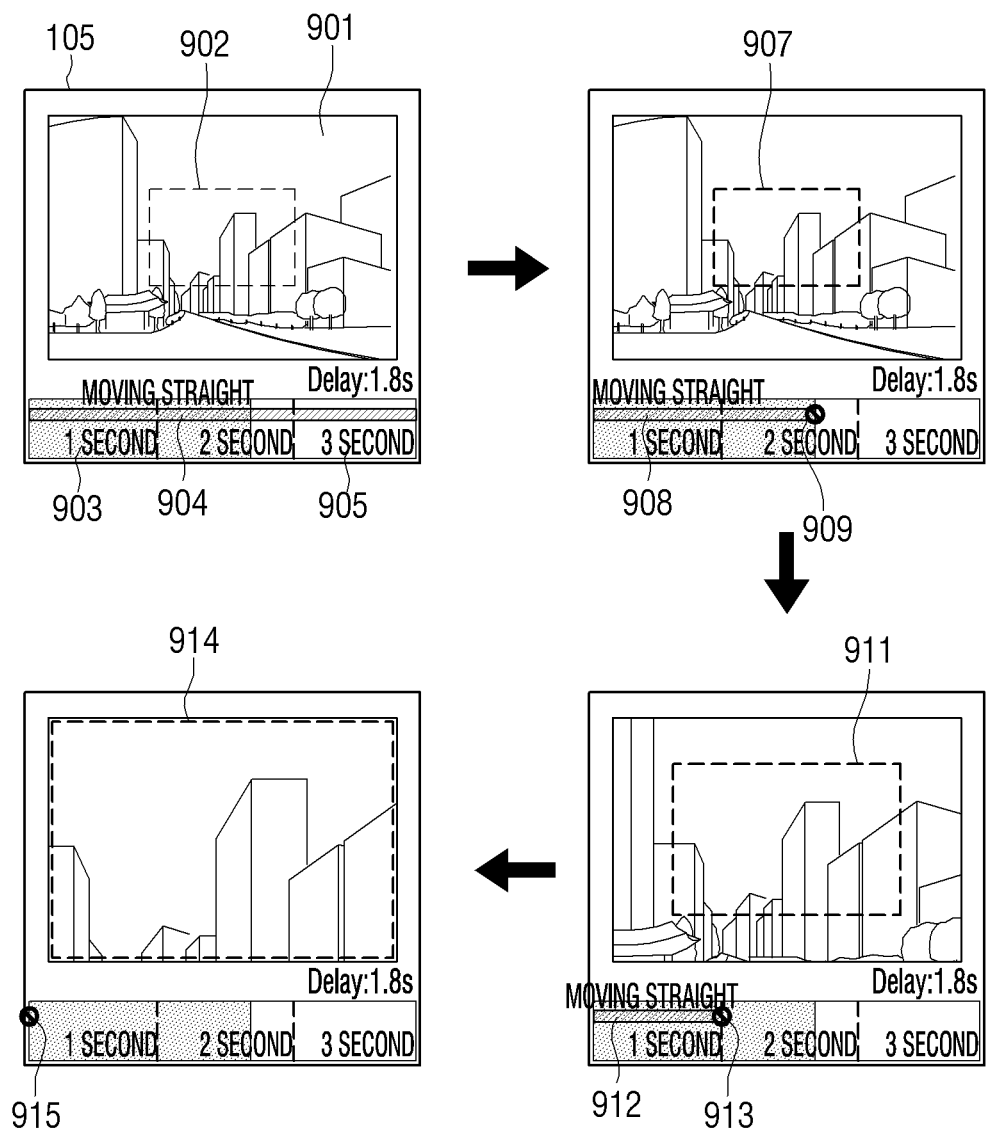

FIG. 9A illustrates another example of a graphical object displayed on a screen of the electronic device 100 according to a user's stop command as the robot 200 moves forward. The size of the graphical object may change as time goes by. The first drawing of FIG. 9A indicates where a user does not enter a stop command, the second drawing indicates that the user has entered a stop command, and the third and fourth drawings illustrate that time has passed after the stop command was entered.

The electronic device 100 may change the color of the graphical object 902 based on a command input by the user. In addition, the electronic device 100, after receiving the command input by the user, may change the size of the graphical object 902 according to the amount of time elapsed. In other words, the size of the graphical object 902 of the electronic device 100 may change according to the time delay.

In the first drawing of FIG. 9A, an image 901 transmitted from the robot 200 and the graphical object 902 are illustrated. The graphical object 902 may be a quadrilateral, especially but not limited to a rectangle, having the same ratio (i.e., width to height ratio) as the aspect ratio of the screen. The size of the graphical object 902 may vary according to the time delay between the robot 200 and the electronic device 100. The color of the graphical object 902 may change according to an input of a user command. For example, when the user command is not entered, the graphical object 902 may be displayed in red, and when the user command is input, the graphical object 902 may be displayed in blue.

In the second area of the display 105, a time bar 905, a delay bar 903, and a command bar 904 may be displayed. The length of the command bar 904 may indicate the time when the corresponding command is input, that is, the duration time for which the command was maintained. Inside the command bar 904, a text corresponding to the command may be displayed. For example, the command bar 904 may indicate that the move forward command was entered for 3 seconds. In the first area of the display 105, a screen 901 corresponding to an image transmitted from the robot 200 may be displayed, and the graphical object 902 indicating the current position of the robot 200 may be indicated in red.

In the second drawing of FIG. 9A, in the first area of the display 105, the graphical object 902 may be displayed in blue. The position where the graphical object 907 is displayed may be determined according to the position of the robot 200. The color of the graphical object 907 may be determined according to a user command.

In the second area of the display 105, an icon 909 corresponding to a stop command input by the user may be displayed. For example, after the user enters a move forward command for 3 seconds, and when the user enters a stop command after 1.2 seconds elapse, the length of the command bar 908 may decrease to a length corresponding to 1.8 seconds (i.e., 3−1.2=1.8), and the icon 909 corresponding to the stop command may be displayed at the right edge of the command bar 908, and the color of the graphical object 907 may change from red to blue.

The third drawing of FIG. 9A illustrates that, as the robot 200 stops, the time delay between the robot 200 and the electronic device 100 may be reduced and the graphical object 911 is illustrated comparatively larger than the graphic object 907 of the second drawing.

That is, the size of the graphic object 911 that represents a current position or viewing angle of the robot 200 may increase in size. As the time delay decreases, the length of the command bar 912 may be reduced, and an icon 913 corresponding to the stop command may move to the left.

In the fourth drawing of FIG. 9A, when the time delay between the robot 200 and the electronic device 100 is 0, the size of the graphical object 914 may be the same size as the screen 105 and an icon 915 corresponding to a stop command may reach the left edge of the time bar.

Figure 9B:
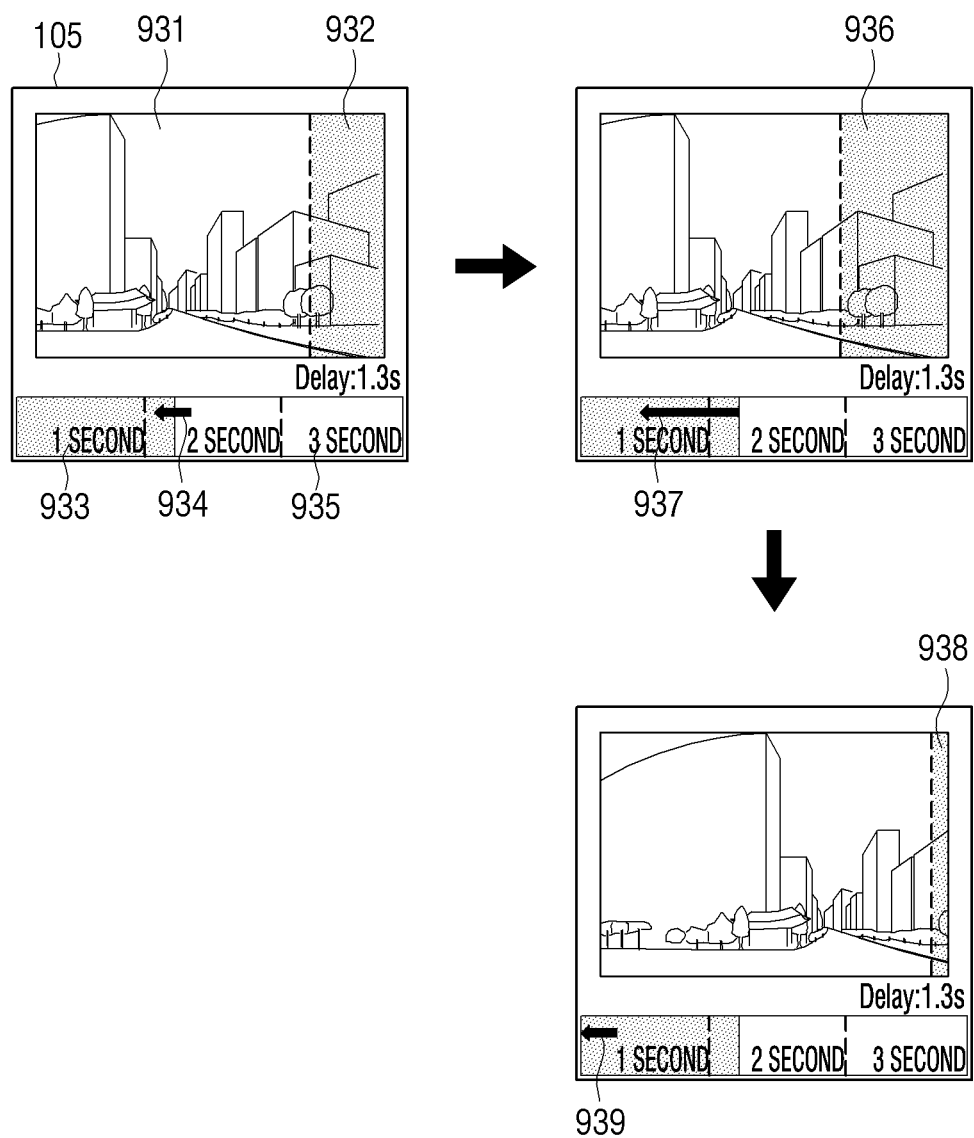

FIG. 9B illustrates another example of a graphical object displayed on a screen of the electronic device according to a user command to rotate the robot 200. The graphical object may be a guide UI indicating information about an estimated field of vision of the robot 200 at the current time.

FIG. 9B illustrates a screen 931 corresponding to an image photographed by the robot 200, graphical objects 932, 936, 938, a time bar 935, a delay bar 933, and rotate command icons 934, 937, 939.

In the case where the robot 200 is rotating while moving forward at the same time, the image 931 photographed by the robot 200 and the graphical object 932 according to the rotation of the robot 200 may be displayed on the screen. The graphical object 932 may be a guide UI element. The electronic device 100, when the robot 200 starts rotating (i.e., yawing), may determine an area which may no longer be visible on the screen according to the rotation of the robot 200 and display the graphical object 932 in the area of the screen.

For example, when the robot 200 moves forward while rotating left, the screen may be panning toward in the left direction and a portion of the screen on the right-hand side may gradually disappear. However, due to the time delay between the robot 200 and the electronic device 100, even though the robot 200 may have actually begun to rotate, on the screen of the electronic device 100 may still display an image of the robot 200 flying straight ahead. Thus, the electronic device 100 may display, on the image of the robot 200 moving forward, an area that would have presumably disappeared from the screen due to the rotation of the robot 200 as an overlaid graphical object.

To be specific, the electronic device 100, by using the time delay information between the robot 200 and the electronic device 100 as well as any other relevant information such as the rotational speed of the robot 200, may determine an area that would have been obscured from the screen 931, and display a graphical object to visually demarcate the area. As time passes by, the area which disappears from the screen may grow gradually and then, as the time delay between the robot 200 and the electronic device 100 decreases, the off-view area may gradually decrease as well.

In the first drawing of FIG. 9B, while the robot 200 moves straight ahead, the time delay may occur between the robot 200 and the electronic device 100, and according to a rotate command input by a user, the icon 934 corresponding to the rotate command may be displayed in the second area of the display 105. The length of the rotate command icon 934 can change in response to the direction of rotation and the amount of time for which the rotate command is issued. In the right side of the screen, the off-view area 932 to disappear from the screen according to the rotation of the robot 200 may be demarcated, for example, by changing the hue, tint, brightness of the area 932 or drawing a line that borders the area 932.

As shown in the second drawing of FIG. 9B, as a command to rotate the robot 200 to the left continues to be entered, the electronic device 100, based on the rotate command and the duration of the rotate command, may lengthen the icon 937 and move the icon 937 to the left towards an edge of the time bar. In addition, the electronic device 100, as the angle of rotation of the robot 200 in the left direction increases, the area 936 on the right-hand side of the screen that disappears from the screen may increase in size.

As shown in the third drawing of FIG. 9C, as the robot 200 continues to rotate left, the screen may pan in the left direction, and accordingly, the off-view area 938 disappearing from the screen may decrease in size. The electronic device 100, by using the direction change information and the time delay information of the robot 200, may determine the size of the off-view area 938 disappearing from the screen and display the graphical object accordingly.

Although FIG. 9B illustrates the screen 931 as displaying the rotate command bars 934, 937, 939 that correspond to a rotation command to the left (i.e., yawing to the left), the same principles described above may be applied to other types of commands having different directions. For example, the screen 931 may display user commands that correspond to various directions and movements such as rolling, pitching, yawing, accelerating, decelerating, and any combination thereof.

Figure 10A:
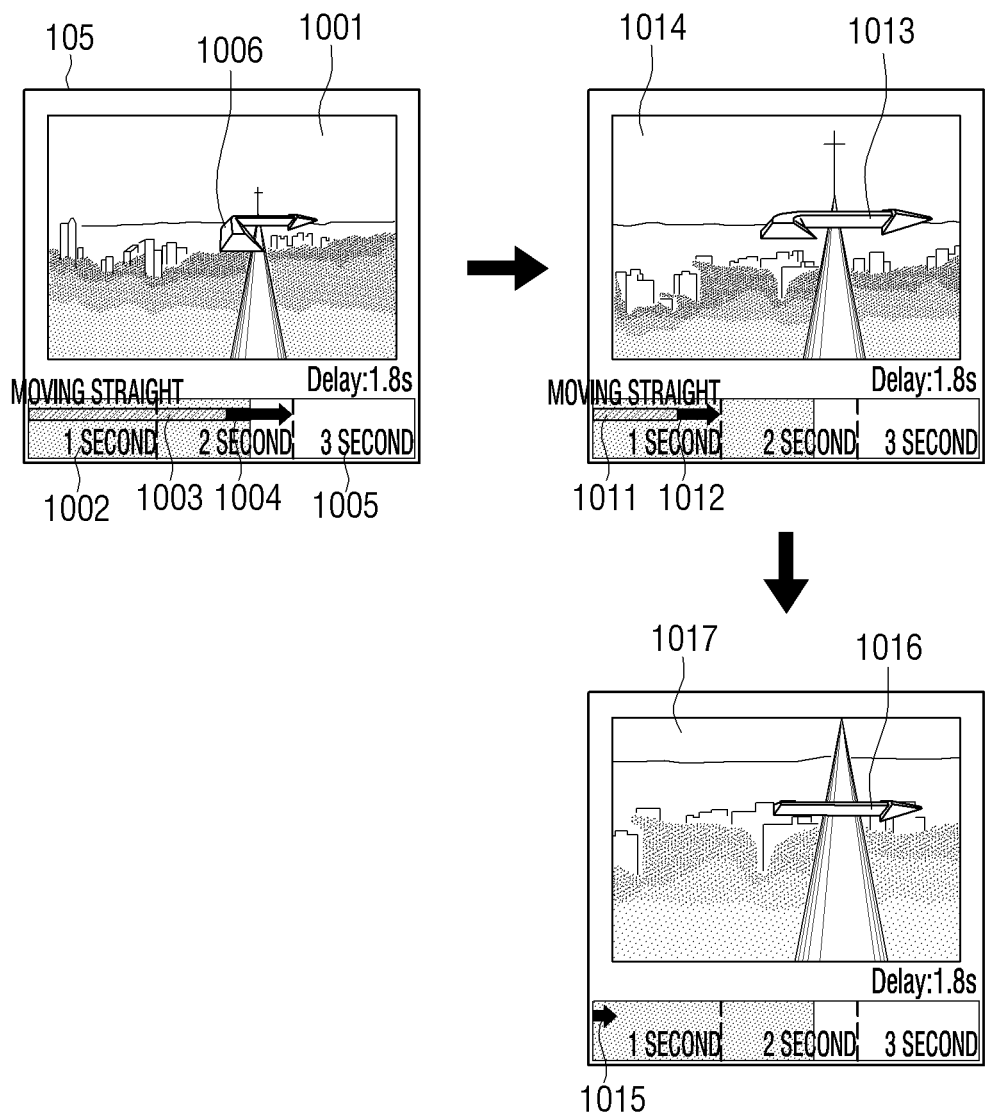

FIG. 10A illustrates another example of a graphical object displayed on a screen of the electronic device 100 as the robot 200 rotates right while moving forward.

In the first drawing of FIG. 10A, in the first area of the display 105, an image 1001 transmitted from the robot 200 and a graphical object 1006 corresponding to a direction of movement of the robot 200 may be displayed. In the second area of the display 105, a time bar 1005, a delay bar 1002, a forward movement command bar 1003, and a rotate command bar 1004 may be displayed.

While the robot 200 moves straight ahead, when a user enters a rotate right command, the electronic device 100 may determine a position where the robot 200 turns right on the screen 1001 with reference to the time delay between the robot 200 and the electronic device 100, and display the corresponding graphical object 1006 overlaid on the screen. For example, when the time delay between the robot 200 and the electronic device 100 is 1.8 seconds, and if the user enters a rotate right command, the electronic device 100 may display the graphic object 1006 such that the robot 200 moves forward for 1.8 seconds and then turns right on the screen. That is, on the screen 1001, the arrow 1006 bending toward the right may be displayed, and the length of the forward movement portion of the arrow (i.e., before the bend) may correspond to a length that corresponds to 1.8 seconds.

The forward movement command bar 1003 displayed on the second area of the display 105 may indicate that the robot 200 may move forward for the next 1.8 seconds. The direction of the arrow of the rotate command bar 1004 may indicate the direction of rotation, and the length of the rotate command bar 1004 may include an angle of rotation, that is, information about the amount of rotation.

For example, when the user enters a rotate command while the robot 200 is moving straight ahead, the electronic device 100, by referring to the information regarding the time delay between the robot 200 and the electronic device 100, may display a forward movement command bar 1003 corresponding to 1.8 seconds and display a right arrow 1004 at the right edge of the forward movement command bar 1003.

As shown in the second drawing of FIG. 10A, in the first area of the display 105, an arrow 1013 bending toward the right may displayed. As the robot 200 turns right, the electronic device 100 may display the arrow where the length of the straight portion of the arrow is shortened, and where the length of the bent portion of the arrow is lengthened. In the second area of the display 105, the forward movement command bar 1011 and the rotate command bar 1012 may be displayed. When the user continues to issue the rotate right command for a duration of time, the electronic device 100 may shorten the length of the forward movement command bar 1011 based on the time of the command.

As shown in the third drawing of FIG. 10A, in the first area of the display 105, an arrow 1016 is displayed. After issuing the rotate command, as time corresponding to the time delay between the robot 200 and the electronic device 100 elapses, the straight portion of the arrow is no longer displayed, and only the bended portion of the arrow (pointing to the right) may be displayed on the screen. The electronic device 100 may check the duration of time of the rotate command, and based on this time duration, may display the arrow 1016. In the second area of the display 105, a rotate command bar 1015 may be displayed. As time elapses, the forward movement command bar may disappear entirely and only the rotate command bar 1015 may be displayed on the screen.

Although FIG. 10A illustrates the screen 1001 as displaying graphical objects and command bars that correspond to a rotation command to the right (i.e., yawing to the right), the same principles described above may be applied to other types of commands having different directions. For example, the screen 1001 may display user commands that correspond to various directions and movements such as rolling, pitching, yawing, accelerating, decelerating, and any combination thereof.

Figure 10B:
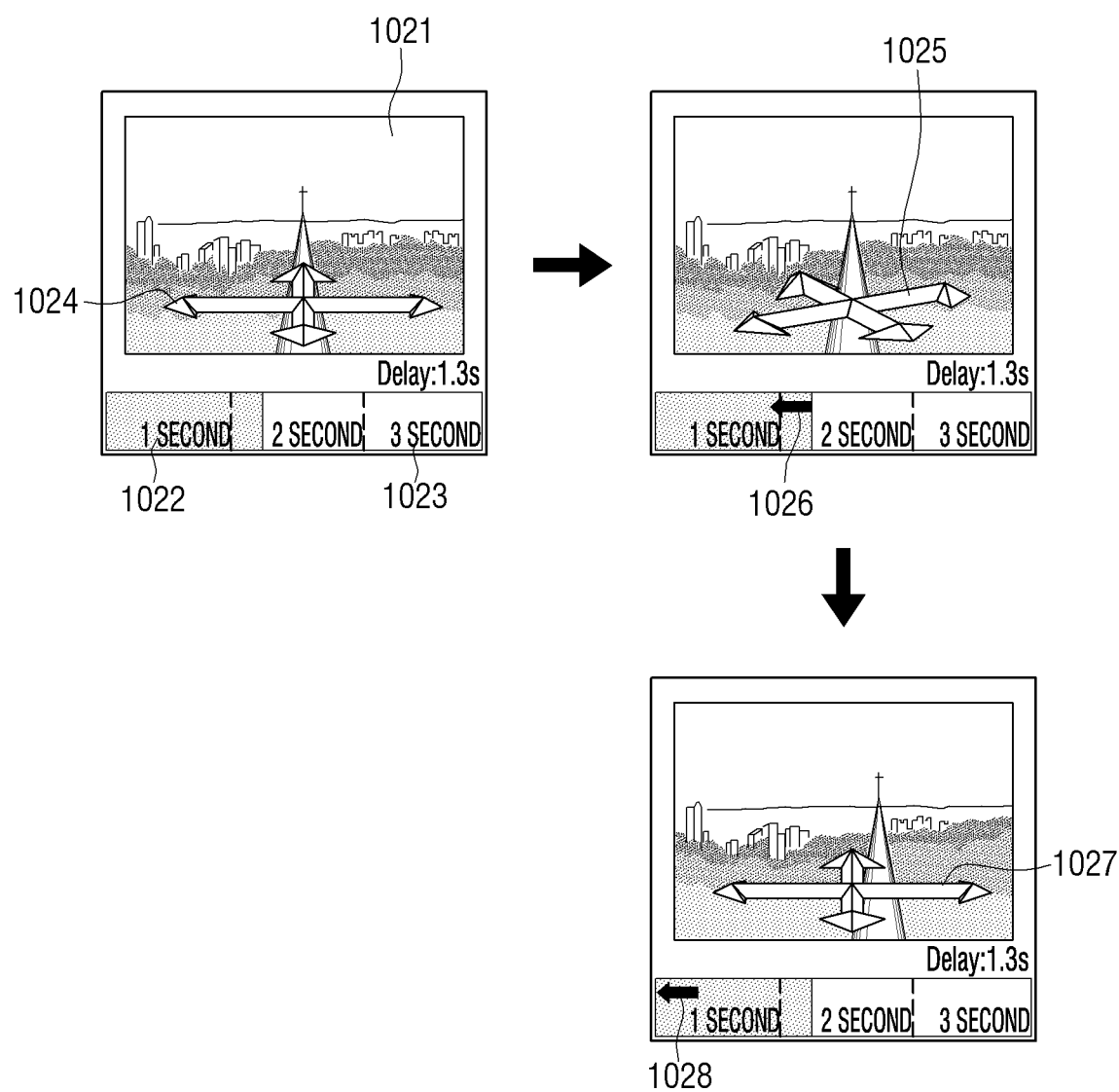

FIG. 10B illustrates an example of displaying a rotation axis of the robot 200 on a screen of the electronic device 100 in response to a rotate command input by a user.

As shown in the first drawing of FIG. 10B, in the first area of the display, an image 1021 transmitted from the robot 200 and a graphical object 1024 corresponding to a rotation axis of the robot 200 may be displayed. In the second area of the display 105, a time bar 1022 and a delay bar 1023 may be displayed. The graphical object 1024 may indicate an axis of rotation and a direction of movement for the robot 200. As the robot 200 moves in the forward direction, the graphical object 1024 may be displayed as an arrow indicating four directions—forward, backward, left, and right—of the robot 200.

The second drawing of FIG. 10B illustrates a state where the user has entered a rotate left command. As the user enters a rotate left command, the graphical object 1025 may be rotated such that the angle of rotation of the graphical object 1025 may correspond to the amount of time for which the rotate left command was issued. In the second area of the display 105, a rotate command bar 1026 may be displayed.

As shown in the third drawing of FIG. 10B, after the rotate left command is issued by the user, as time passes and while the screen has panned to the left, a graphical object 1027 may be displayed. In the second area of the display 105, a rotate command bar 1028 may move to the left towards an edge of the time bar.

Although FIG. 10B illustrates the screen 1021 as displaying graphical objects and command bars that correspond to a rotation command to the left (i.e., yawing to the left), the same principles described above may be applied to other types of commands having different directions. For example, the screen 1021 may display user commands that correspond to various directions and movements such as rolling, pitching, yawing, accelerating, decelerating, and any combination thereof.

Figure 11:
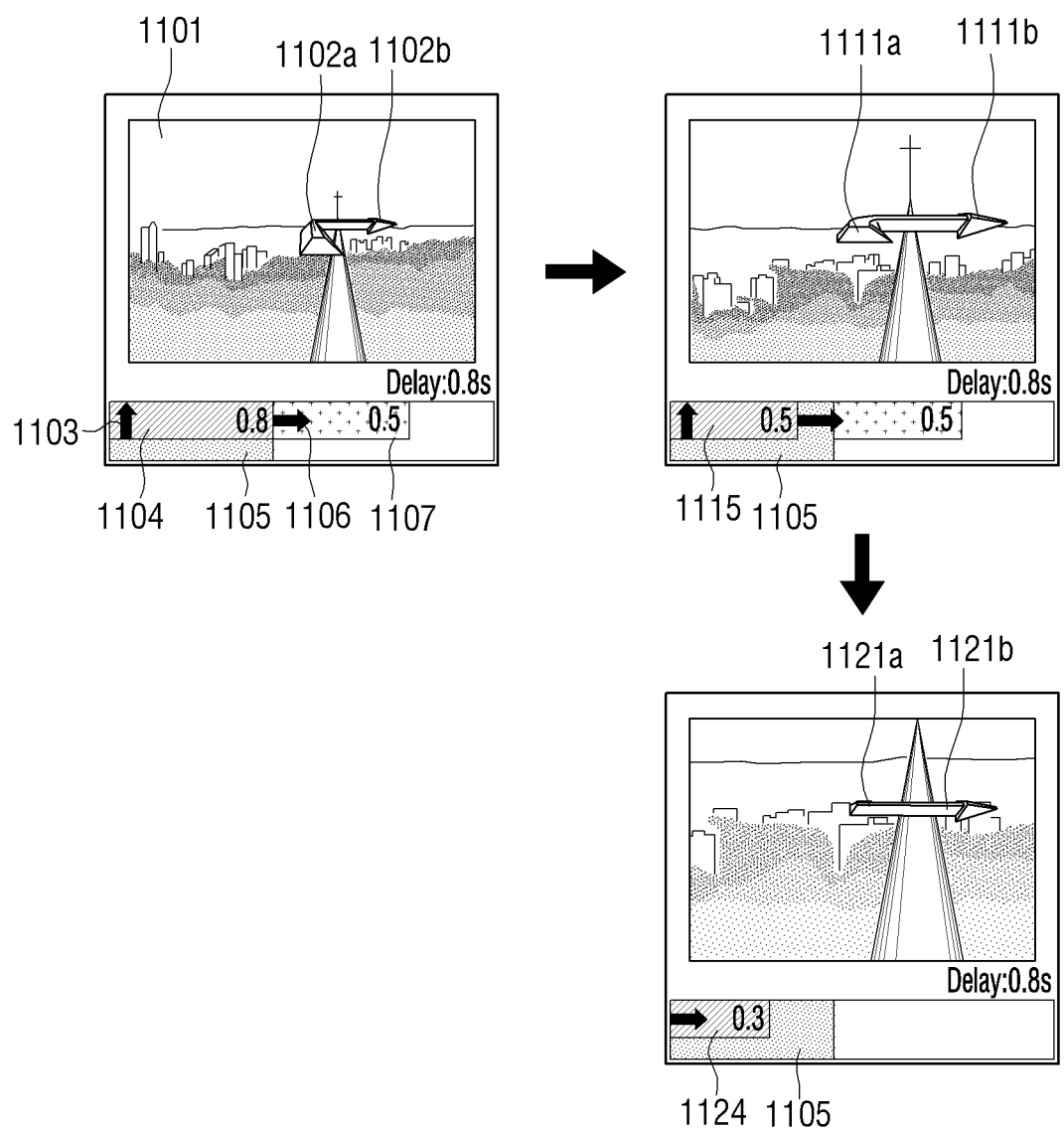

FIG. 11 illustrates another example of a graphical object displayed on a screen of the electronic device 100 as the robot 200 moves forward while rotating.

The first drawing of FIG. 11 illustrates a screen 1101, graphical objects 1102*a*, 1102*b*, a delay bar 1105, a forward movement command bar 1104, a forward movement command icon 1103, a rotate command bar 1107, and a rotate command icon 1106.

The length of the forward movement command bar 1104 may change based on the duration of time for which the forward movement command was issued. The length of the rotate command bar 1107 may change based on the duration of time for which the rotate command was issued. For example, the forward movement command bar 1104 may indicate that the forward movement command was sustained for 0.8 seconds. In addition, the rotate command bar 1107 may indicate that the rotate command was sustained for 0.5 seconds. That is, while the time delay between the robot 200 and the electronic device 100 is 0.8 seconds, and while the robot 200 is moving forward, if the user issues a rotate command for 0.5 seconds, the robot 200 may move forward for 0.8 seconds and then rotate to the right for 0.5 seconds. The forward movement command icon 1103 and the rotate command icon 1106 may indicate the direction of movement for the robot 200.

The graphical objects 1102*a*, 1102*b* may be displayed together on the screen 1101 as an arrow that is bent toward the direction of rotation (e.g., right). That is, the arrow may include the portion 1102*a* corresponding to the forward movement and the portion 1102*b* corresponding to the rotation to the right. Accordingly, the graphical objects 1102*a*, 1102*b* displayed on the screen may inform the user that the robot 200 will move straight ahead for a finite duration of time and then turn right. At this time, on the screen 1101, the position and the shape of the graphical objects 1102*a*, 1102*b* may be determined based on the time delay between the robot 200 and the electronic device 100 and any commands input by the user. The length of each portion 1102*a*, 1102*b* of the arrow may be proportional to the time duration associated with the corresponding command input by the user.

In the second drawing of FIG. 11, graphical objects 1111*a*, 1111*b* and a forward movement command bar 1115 are illustrated. In case of the straight portion 1111*a* of the arrow graphical object, the length of the straight portion 1111*a* may decrease as the robot 200 continues to move in the forward direction. In case of the bended portion 1111*b* of the arrow graphical object, the length of the bended portion 1111*b* may decrease as the rotate left command time increases. That is, the electronic device 100, based on the commands input by the user, may determine the position and the shape of the graphical objects 1111*a*, 1111*b*.

In addition, the length of the forward movement command bar 1115 may be shortened compared to that of the first drawing. After the rotate command is input and as time elapses, the length of the forward movement command bar 1115 may decrease. That is, the electronic device 100 may, based on the commands input by the user and the time durations of the commands, determine the type and the length of the command bar.

In the third drawing of FIG. 11, graphical objects 1121*a*, 1121*b* and a rotate command bar 1124 are illustrated. After the user issues a rotate command and when time equivalent to the time delay elapses, the robot 200 may start to rotate, and according to the rotation of the robot 200, the straight portion 1121*a* of the arrow graphical object may disappear and only the bended portion 1121*b* of the arrow may remain on screen. In addition, when the robot 200 finishes moving forward and begins to rotate, the forward movement command bar 1115 may disappear from the display 105, and the length of the rotate command bar 1124 may gradually decrease.

Figure 12:
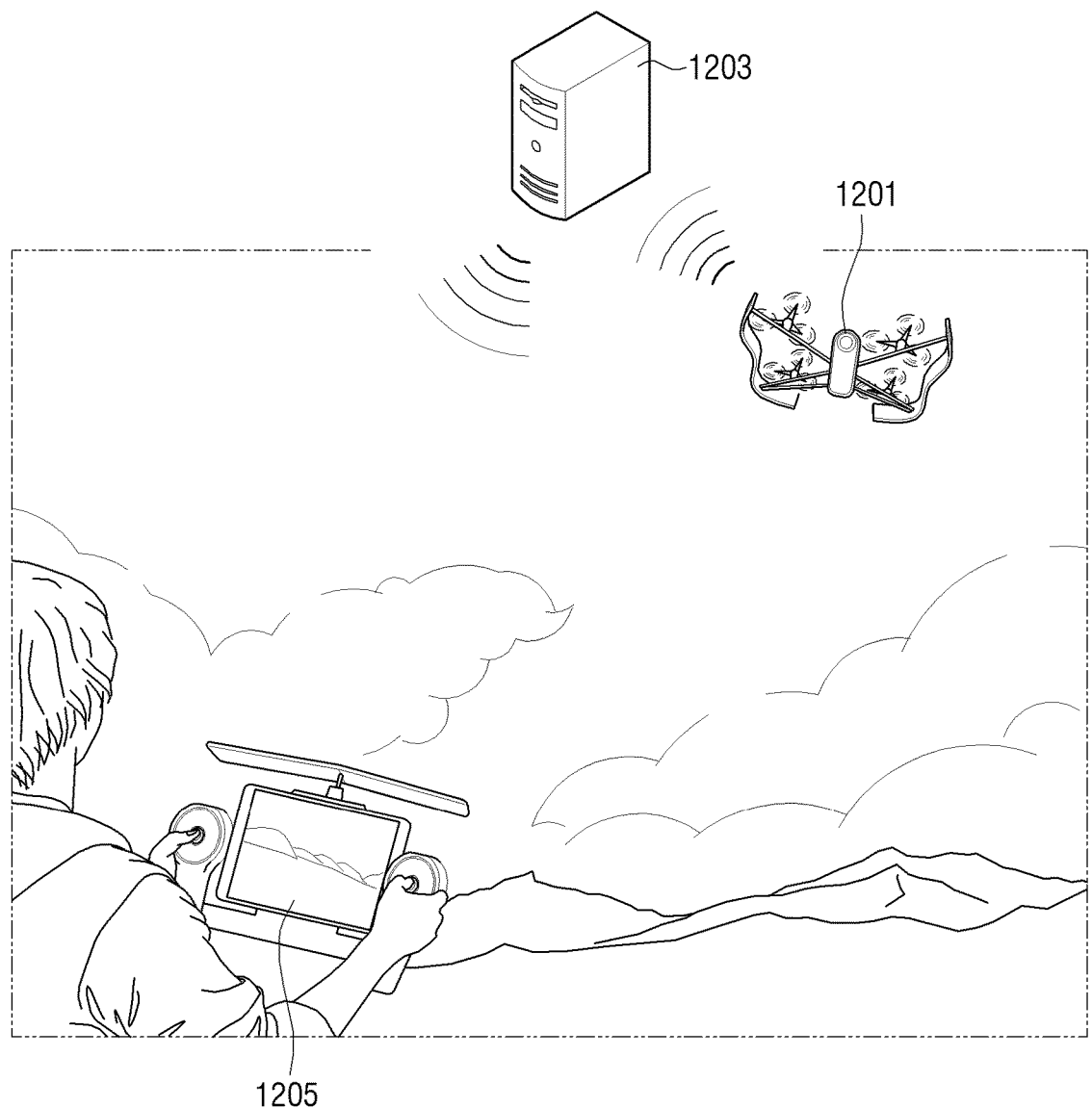
FIG. 12 illustrates a system configuration according to another exemplary embodiment.

FIG. 12 illustrates a system configuration according to another exemplary embodiment.

FIG. 12 illustrates an electronic device 1205, a server 1203, and a robot 1201. The robot 1201 may be, for example, a drone-type aerial vehicle and may include a camera. The robot 1201 may transmit an image photographed by the camera to the server 1203. The server 1203 may be located in a remote location, and the robot 1201 may communicate with the server 1203 wirelessly. The server 1203 may calculate the time delay with respect to an image received generated by the robot 1203, create a screen that consists of the image and a graphical object corresponding to the time delay, and transmit the screen to the electronic device 1205. The robot 1203 may transmit the screen to the electronic device 1205 via the server 1203.

The electronic device 1205 may include a display, and display the image received from the server on the display. The electronic device 1205 may be equipped with a remote controller for controlling the robot 1201. For example, a user may control the robot 1201 while watching an image transmitted from the robot 1201 via the server 1203.

A non-transitory computer-readable medium is a machine-readable storage medium configured to permanently or semi-permanently store data. Specifically, the above-described various applications or programs may be stored in the non-transitory computer-readable medium such as a compact disc (CD), a digital versatile disc (DVD), a hard disk, a Blu-ray disc, a universal serial bus (USB) device, a memory card, or a read-only memory (ROM), and then provided to a user terminal device. The non-transitory computer-readable medium does not include transitory media such as a register, a cache, a random access memory (RAM), a wire, and a signal per se.

The foregoing exemplary embodiments are merely exemplary and are not to be construed as limiting. Exemplary embodiments can be readily applied to other types of devices or apparatuses. Also, the description of exemplary embodiments is intended to be illustrative, and not to limit the scope of an inventive concept, and many alternatives, modifications, and variations will be apparent to those skilled in the art and may be made therein without departing from the spirit and scope of the present disclosure as defined by the appended claims and their equivalents.

What is claimed is:

1. An electronic device remotely controlling a movement of a robot, the electronic device comprising:
   a communicator;
   an inputter;
   a display; and
   a controller configured to:
   control the communicator to receive, from the robot, an image photographed by the robot and time information regarding the image,
   obtain time delay information between the electronic device and the robot based on the time information,
   control the display to display the image, the time delay information and a graphical object to be overlaid on the image based on the time delay information,
   control the communicator to transmit a command to control the robot received through the inputter, to the robot, and
   control the display to display an icon corresponding to the command.

2. The electronic device as claimed in claim 1, wherein the controller is further configured to control the display to display a time bar including the time delay information and the icon on the time bar.

3. The electronic device as claimed in claim 2, wherein the controller is further configured to determine a display position of the icon on the time bar based on the time delay information.

4. The electronic device as claimed in claim 1, wherein the command is at least one of a stop command or a rotate command, and
   wherein the controller is further configured to determine a shape of the icon based on a type of the command.

5. The electronic device as claimed in claim 1, wherein the controller is further configured to determine a shape of the graphical object based on a type of the command.

6. The electronic device as claimed in claim 1, wherein the controller is further configured to identify the image into a plurality of regions based on the graphical object, and control the display to display the plurality of regions differently.

7. The electronic device as claimed in claim 1, wherein the image indicates information corresponding to a viewpoint of the robot at a first time, and
   the graphical object indicates information corresponding to a viewpoint of the robot at a second time after the first time.

8. A method for displaying a screen of an electronic device remotely controlling a movement of a robot, the method comprising:
   receiving, from the robot, an image photographed by the robot and time information regarding the image;
   obtaining time delay information between the electronic device and the robot based on the time information;
   displaying the image, the time delay information and a graphical object to be overlaid on the image based on the time delay information;
   receiving a command to control the robot;
   transmitting the command to the robot; and
   displaying an icon corresponding to the command.

9. The electronic device as claimed in claim 8, wherein the displaying the image comprises displaying a time bar including the time delay information, and
   wherein the displaying the icon comprises displaying the icon on the time bar.

10. The electronic device as claimed in claim 9, wherein the displaying the icon comprises determining a display position of the icon on the time bar based on the time delay information.

11. The electronic device as claimed in claim 8, wherein the command is at least one of a stop command or a rotate command, and
    wherein the displaying the icon comprises determining a shape of the icon based on a type of the command.

12. The electronic device as claimed in claim 8, wherein the displaying the image comprises determining a shape of the graphical object based on a type of the command.

13. The electronic device as claimed in claim 8, wherein the displaying the image comprises identifying the image into a plurality of regions based on the graphical object, and displaying the plurality of regions differently.

14. The electronic device as claimed in claim 8, wherein the image indicates information corresponding to a viewpoint of the robot at a first time, and
    the graphical object indicates information corresponding to a viewpoint of the robot at a second time after the first time.

* * * * *